(12) United States Patent
Collins et al.

(10) Patent No.: US 6,225,263 B1
(45) Date of Patent: May 1, 2001

(54) USE OF OIL AND GAS FIELD CHEMICALS

(75) Inventors: Ian Ralph Collins, Sunbury; Stephen Paul Goodwin, London; James Charles Morgan, Yateley; Nevin John Stewart, Guildford, all of (GB)

(73) Assignee: BP Chemicals Limited, London (GB)

( * ) Notice: Subject to any disclaimer, the term of this patent is extended or adjusted under 35 U.S.C. 154(b) by 0 days.

(21) Appl. No.: 09/232,185

(22) Filed: Jan. 15, 1999

Related U.S. Application Data

(63) Continuation-in-part of application No. PCT/GB97/01877, filed on Jul. 11, 1997.

(30) Foreign Application Priority Data

Jul. 17, 1996 (GB) .................................................. 9615044

(51) Int. Cl.⁷ ............................ E21B 43/16; E21B 43/22; E21B 33/13
(52) U.S. Cl. .......................... 507/261; 507/247; 166/295; 166/307; 166/305.1
(58) Field of Search .................................. 507/261, 247; 166/295, 305 R, 307

(56) References Cited

U.S. PATENT DOCUMENTS

| | | | |
|---|---|---|---|
| 3,402,770 | 9/1968 | Messenger et al. | 166/40 |
| 3,481,870 | 12/1969 | Cheng et al. | 507/90 |
| 3,483,925 | 12/1969 | Slyker et al. | 166/279 |
| 3,488,289 | 1/1970 | Tate | 252/180 |
| 3,827,497 * | 8/1974 | Dycus et al. | 166/274 |
| 3,890,239 * | 6/1975 | Dycus et al. | 507/254 |
| 3,902,557 | 9/1975 | Shaughnessy et al. | 166/295 |
| 3,915,232 | 10/1975 | Gruesbeck et al. | 166/295 |
| 3,920,073 | 11/1975 | Holm | 166/274 |
| 3,939,911 | 2/1976 | Maddox, Jr. et al. | 166/274 |
| 4,008,165 | 2/1977 | Maddox, Jr. et al. | 507/247 |
| 4,184,549 | 1/1980 | Schievelbein | 166/269 |
| 4,192,382 | 3/1980 | Schievelbein | 166/269 |
| 4,192,755 * | 3/1980 | Flournoy et al. | 507/242 |
| 4,194,563 | 3/1980 | Schievelbein | 166/273 |
| 4,457,373 | 7/1984 | Balzer et al. | 166/274 |
| 4,643,253 * | 2/1987 | Shepard, Jr. et al. | 166/274 |
| 4,970,007 | 11/1990 | Miller et al. | 507/255 |
| 5,002,126 | 3/1991 | Carlberg et al. | 166/279 |
| 5,039,434 * | 8/1991 | Watkins et al. | 507/234 |
| 5,092,405 | 3/1992 | Prukop | 166/272 |
| 5,690,174 | 11/1997 | Chapman et al. | 166/275 |

FOREIGN PATENT DOCUMENTS

| | | |
|---|---|---|
| 0 224 346 | 6/1987 | (EP) . |
| 13007 | 7/1997 | (NG) . |
| 25756 | 7/1997 | (IR) . |
| 96/22451 | 7/1996 | (WO) . |

\* cited by examiner

Primary Examiner—Lyle A. Alexander
Assistant Examiner—Latoya I. Cross
(74) Attorney, Agent, or Firm—Nixon & Vanderhye

(57) ABSTRACT

A method of recovering or increasing the recovery of oil and/or gas from an underground formation involving injecting into the formation, preferably in the form of an aqueous solution, at least one mono alkyl ether of polyethylene glycol in which the alkyl group has 3–5 carbons and the polyethylene glycol contains 3–6 ethylene oxy units e.g. butyl ether of triethylene glycol. Especially preferred are mixtures comprising that and at least one mono alkyl ether of mono or di ethylene glycol e.g. a mixture of butyl triglycol ether, butyl tetraglycol ether, butyl pentaglycol ether and butyl diglycol ether. The method of the invention may be applied to well stimulation treatments such as water blocking, sand consolidation, sandstone acidizing and methods of increasing the recovery of oil such as tertiary oil recovery.

19 Claims, No Drawings

USE OF OIL AND GAS FIELD CHEMICALS

This application is CIP of PCT/GB97/01877 filed in Great Britain of Jul. 11, 1997 which claims priority of Great Britain application 96/50446 filed on Jul. 17, 1996.

This invention relates to oil and gas field chemicals and their use especially in increasing oil or gas recovery.

In use the rate of oil recovery from oil and gas fields often reduces with time.

The reduction is often associated with formation damage which can manifest itself as reduced permeability of the formation to oil or gas. In addition it is often desirable to inject water based fluids into a formation at a distance from a producing well to drive the oil into the well.

For stimulation of oil recovery by injection of chemicals into a producing well to overcome problems with formation damage e.g. water blocking, very dilute aqueous solutions of nonionic or anionic surfactants have been described, in particular alkoxylated alkyl sulphates and alkoxylated alkaryl sulphonates (see U.S. Pat. No. 5,092,405).

U.S. Pat. No. 3,902,557 describes a method of treating the formation surrounding a well by injection of a solvent including a $C_4$ to $C_{10}$ alkyl ether of a polyglycol ether containing a $C_4$ to $C_{10}$ alkyl ether of a polyglycol ether containing 10–22 carbon atoms per molecule. The solvent is said to improve the permeability of the formation adjacent to the well bore. $C_4$ to $C_8$ monoalkyl ethers of tri and tetra ethylene glycols are preferred in particular the hexyl ether while the butyl ether is also mentioned. The solvent may be diluted with an organic liquid such as alcohol, e.g. isopropanol.

Alkylglycol ethers have now been found that can give substantial improvements in recovery of oil or gas from underground formations, especially in overcoming problems of formation damage.

The present invention provides a method of recovering at least one of oil and gas from an underground formation comprising oil or gas, which comprises introducing into said formation at least one mono alkyl ether of polyethylene glycol in which the alkyl group has 3–5 carbons and the polyethylene glycol contains 3–6 ethylene oxy units (hereinafter called compound 1), and recovering oil and/or gas from said formation. The preferred monoalkyl ether is a mono butyl ether The present invention also provides a method of increasing the recovery of at least one of oil and gas from an underground formation comprising it, which comprises introducing into said formation at least one compound 1, and recovering oil and/or gas from said formation.

The present invention also provides a method of recovering at least one of oil and gas from an underground formation comprising oil or gas wherein a formulation, comprising at least one mono alkyl ether of polyethylene glycol in which the alkyl group has 3–5 carbons and the polyethylene glycol contains 3–6 ethylene oxy units is introduced into said formation and oil and/or gas is recovered wherein the method is not a squeeze treatment in which at least one alkyltriglycol ether and at least one water miscible oil or gas field production chemical are introduced into the formation.

The compound is a monoalkyl ether of a polyethylene glycol, in which the alkyl group is a straight or branched chain alkyl group of 3–5 carbons, e.g. n or iso propyl, n, iso, sec., tert-butyl, n, iso, sec., tert-pentyl (amyl), especially n-butyl. There are 3–6 e.g. 4 or 5 ethylene oxy units in compounds 1, though 3 are most preferred. Examples of suitable compound 1 are the mono-n-butyl ether of triethylene glycol, also known as n butyl triglycol ether, and the mono-n butyl ethers of tetraethylene glycol and penta ethylene glycol. The compound 1 may be substantially pure or may be a mixture with at least one corresponding alkyl ether of another polyethylene glycol, especially with 3–6 ethylene oxy units, In particular the mixture may comprise at least 60% especially at least 80% e.g 60–99%, or 80–98% of the compound(s) 1 and up to 40% especially up to 20% e.g. 1–40% or 2–20% of these other glycol ethers. The mixture may also comprise the monoalkyl ethers of a mixture of the polyethylene glycols, said glycols with a molar average of 2.6–6.4 e.g. 2.9–4.5 or 4.0–5.8 ethylene oxy units. The glycol ethers, compounds 1 are usually weakly structuring amphiphiles. The mixture may also contain small amounts e.g. up to 10% each of $C_{3-5}$ alkyl monoalkyl ethers of polyethylene glycols with 7–20 e.g. 7–10 ethylene oxy units, especially with a total of up to 40% or 30% of these ethers.

Compound(s) 1 may be used alone or may be used in admixture with other glycol ethers still such as mono alkyl ethers of mono and di ethylene glycol, in which the alkyl group which may be straight or branched has 1–8 carbons e.g. methyl, ethyl, propyl, butyl, hexyl or octyl. Examples are Ethylene glycol mono ethyl ether, Ethylene glycol mono-n-propyl ether, Ethylene glycol monoiso-propyl ether, Ethylene glycol mono-n-butyl ether, Ethylene glycol mono-isobutyl ether, Ethylene glycol mono-2-butyl ether, Ethylene glycol mono-tert-butyl ether, Diethylene glycol mono-n-propyl ether, Diethylene glycol mono-iso-propyl ether, Diethylene glycol mono-n-butyl ether, Diethylene glycol mono-isobutyl ether, Diethylene glycol mono-2-butyl ether, Diethylene glycol mono-tert-butyl ether, Diethylene glycol mono-n-pentyl ether, Diethylene glycol mono-2-methylbutyl ether, Diethylene glycol mono-3-methylbutyl ether, Diethylene glycol mono-2-pentyl ether, Diethylene glycol mono-3-pentyl ether, Diethylene glycol mono-tert-pentyl ether. Mono-methyl or mono ethyl ethers of triethylene glycol may also be used. The amounts of compound(s) 1 in these mixtures may be at least 60% especially at least 70% e.g. 60–98% or 70–98%, and the amount of the other glycol ether may be up to 40% e.g. up to 20% such as 1–40% or 2–30% by weight of the total mixture. In the present invention it is possible to use co-product streams from glycol ether manufacturing processes which contain a high proportion of glycol ethers, especially alkyl triglycol ethers such as e.g. n-butyltriglycol ether. Such a co-product stream may comprise a majority of n-butyltriglycol ether with smaller amounts of other alkyl triglycol ethers. One such co-product stream comprises 70–80o% e.g. about 75% w/w of n-butyltriglycol ether, 1–5% e.g. about 2.5% w/w of butyldiglycol ether, 15–25% e.g about 19% of butyl tetraglycol ether and 1–5% about 2% of butyl pentaglycol ether. A mixture of about 75% w/w n-butyl triglycol ether, about 2.5% w/w of butyl diglycol ether, about 19% butyl tetraglycol ether and about 2% of butyl pentaglycol ether, hereinafter called Mixture 2 is preferred.

The compound 1 may have an hydrophilic lipophitic balance (HLB) value of 12–17 preferably 14–16.5, especially 14.5–16. The compound 1 is preferably a compound capable when mixed with distilled water and octane in at least one proportion of forming 3 liquid phases at a temperature, which is at least one value in the range 20–200° C., e.g. especially 50–150° C. or 100–130° C. Relative weight proportions of the compound 1, distilled water and octane giving these 3 phases can be 10–50:60–20:50. The compound 1 may also have a cloud point in admixture with distilled water/or especially with water containing up to salt saturation e.g. up to 40 g/l sodium chloride, of 0–250° C., especially 50–150° C., in particular below the reservoir temperature, but may be miscible with the distilled water or formation water at up to 130° C.

The compound 1 may be injected into the formation undiluted, but may also be mixed with water in an aqueous formulation containing at least 1%, particularly 6% and especially at least 15% by weight of compound 1; the formulation may contain 1–99% e.g. 1–60%, particularly 6–50% and especially 15–50% and preferably 25–45% of compound 1. The aqueous medium with the compound 1 may be fresh, tap, river, sea, produced or formation water, with a total salinity of 0–250 g/l e.g. 5–50g/l such as 1045 g/l (especially with a high barium content such as 50–3000 ppm Ba) and pH of 0.5–10 e.g. 3–8 such as 4–6. The formulation may contain a weight amount of compound 1 greater than (preferably at least 5 or 10% greater than) the concentration of compound 1 in the lowest "aqueous" phase of the 3 phase mixture of compound 1, water and octane at a specific temperature of 50–150° C. e.g. 100–130° C. The formulation is usually a one phase liquid whose liquid is preferably consists essentially of water, and is in particular substantially free of any polar organic solvent, in particular an alcohol such as isopropanol.

The formation into which the compound 1 is introduced may be consolidated or unconsolidated, and rock or sand. Examples of rocks are sandstones and carbonates e.g. chalk or limestone, both in homogeneous and fractured form. The sand may be dirty or clean, and may be homogeneous laminated or unconsolidated. The formation is porous to water, oil and gas and may have a sea water permeability in the range 1–5000 mD eg. 5–500 mD. The formation surface to be contacted by the compound 1 may be of one of 3 wettabilities, namely water wet, mixed oil/water wet or oil wet. The formation may be at a temperature of 20–250° C., e.g. 60–200° C. or 80–180° C. such as 110–140° C. and the formation surface to be contacted by the compound may be 30–50° C. below this. Connate/formation water may contain 5–200 g(1 salts, in particular 40–5000ppm barium, and a pH of 0.5–10 especially 3–6.

The formation may have been previously damaged following entry of externally applied aqueous fluid, such as following drilling completion workover or production operations e.g. drilling fluid filtrate or workover, kill, fracture or completion fluids, or by internal fluids such as connate water. The damage may be reduced permeability to oil or gas following blockage of the pores by water (water trapping), or oil wetting of rock, or blockage of the pores by oil (oil trapping). The damage may also result from solids invasion, overbalance pressure, aqueous phase trapping and alteration of wettability.

In the methods of the invention, the glycol ether or formulation may be introduced into the formation comprising oil and/or gas e.g. into the formation surrounding a production well, such as within loom especially within 10 m of said well, as in well stimulation and squeeze treatments, but may also be introduced into a formation distant from said formation from which oil/gas is recovered, such as more than 100 m particularly more than 1 or 2 Km therefrom, e.g. 0.1–5 Km such as 1–3 Km therefrom, as in tertiary oil recovery, in which the glycol ether or formulation is introduced into a secondary or injection well and forced towards the formation comprising the oil/gas to drive it towards a producing well.

Well stimulation involves increasing the production of oil and/or gas from a well. Examples of stimulation methods are reducing water blocking, or increasing sand consolidation or acid treatment such as introducing acidising. Water blocking reduces the permeability of a formation caused by the invasion of water into the pores. Sand consolidation is a treatment such as the injection of a resin e.g. epoxy or formaldehyde resins into a well, by which loose, unconsolidated grains of a producing formation are made to adhere to reduce migration or elution of sand into the well bore and hence to prevent a well from producing sand but allowing it to produce oil and/or gas. Acid treatments may be with organic carboxylic acids, in particular water soluble ones, such as formic acid, or with strong acids, and may be used to dissolve inorganic salts from pores in the formation, such as deposited scale, e.g. insoluble calcium or barium salts. Acidising is a method by which a formation is treated with acid in particular a strong e.g. mineral acid such as hydrochloric acid or hydrofluoric acid, usually under pressure, in order to increase the permeability of the formation, usually by dissolving away parts of the formation e.g. pore walls. The acid may be introduced into the formation with the glycol ether of the invention in the formulation, but preferably the glycol ether formulation is introduced first and after a period of time e.g. 0.1–10 hr, the acid is introduced separately.

In well stimulation treatments, the glycol ether or formulation is introduced from a production well into the formation in order to repair the damage e.g. change the wettability of the formation or remove the water block to increase its permeability. The glycol ether or formulation is passed downhole and forced in plug flow into the formation e.g. by introduction down the production well sequentially, before or after, another phase e.g. mud or drilling fluid, acid solution or completion brine, and shut in for a period of 0.5–4 days, after which period (called shut in) production is restated usually with high oil production rate. The method of the invention can reduce the frequency of shut ins and hence increase overall annual production.

In squeeze treatment a similar approach to well stimlation is adopted but in this case the glycol ether formulation also comprises a production chemical such as an inhibitor of scale, corrosion, gas hydrate formation, wax or asphaltene deposition, or a hydrogen sulphide scavenger or an emulsifier. In such squeeze treatments the compound 1 is preferably one in which there are 4–6 ethylene oxy units, present in amount of at least 30% of the total glycol ether content of the liquid injected. Preferably however the process of the invention especially a well stimulation treatment is performed in the substantial absence of at least one water miscible oil field or gas field production chemical e.g. one as specified above In techniques involving tertiary oil recovery, the glycol ether or formulation is injected at a distance from the producing well and then forced, ideally in plug flow, e.g. by means of subsequently injected pressurized water e.g. formation water as such or containing viscosifying polymers through the formation towards the production well to repair any formation damage and free trapped oil for recovery at the production well. These techniques can improve introduction of recovery fluid e.g. by mobilizing residual oil, which is blocking water flow, increasing the ease of movement of recovery fluid to the production well.

The glycol ethers used in the process of the invention can have the benefit of improved effectiveness at increasing the permeability to gas or oil of damaged formations.

These improvements in oil/gas permeability may be found when the formation is producing fluids (of oil, and water (and optionally gas)) with 1–40% water (i.e. watercut) especially 5–30%.

Preferably the method is not a squeeze treatment which is a process for increasing the effectiveness of production chemicals by reducing the number of squeezing and shut-in operations needed to increase the production rate from an oil well, said process comprising injecting into an oil-bearing rock formation a water-miscible formulation comprising as components.

(a) a water miscible surfactant which is an alkyltriglycol ether especially n-butyl triethylene glycol ether, such as Mixture 2, and (b) at least one water-miscible oil field or gas field production chemical, said components of the formulation being introduced either as a pre-formed single composition, or simultaneously in parallel or sequentially in either order into the rock formation.

The invention is illustrated in the following examples.

EXAMPLE 1

Preserved core, which was a medium grained, well cemented sandstone of porosity 14.5–15% and permeability 198–42mD from a North Sea well was cut into plugs and saturated with synthetic formation water from that well, containing 10 in mg/l 79003 total dissolved salt, 28100 Na, 1630 K, 113 Mg, 615 Ca, 65 Sr, 770 Ba, 46050 Cl, 450 H, 1655 $HCO_3$.

Each plug was loaded into the inner tube of a coreflood apparatus comprising a pair of concentric pressurised tubes sealable at both ends through which a liquid may be passed in either direction. The tubes were then pressurised at ambient temperature at 10.34 MPa for the annulus between the tubes (gross overburden pressure) and 3.45 MPa psi pressure for the core (pore pressure).

1. The core was then saturated with kerosene by flowing 90 pore volumes over 24 hours in a forward direction followed by reduction of the water content to the Swi (saturation water level) by flushing with kerosene at 10 ml/min in both flow 20 directions.
2. The core and lines were than heated to 120° C. and this temperature was maintained for all subsequent steps.
3. Six pore volumes of crude oil from the specific well were passed at 2 ml/min in the reverse direction, and the plug shut in for 24 hrs.
4. The core was then flushed with the formation water at pH 4.5 at 0.07 ml/min using 23 pore volumes in a forward direction for 72 hrs to reduce the oil content to Swo(org) (saturation oil) level, the permeability in the forward direction to the formation water being 28 mD.
5. This first water flood was followed by flooding with kerosene to trap water in the pores by passing at 0.75 ml/min a total of 63 pore volumes for 18 hrs, followed by reducing the water content of the core to the Swi (saturation water) level by flushing with kerosene at an injection rate of 10 ml/min in both flow directions, the permeabilities being 67 and 71 mD respectively.
6. Seven pore volumes of crude oil from the well were then passed through the core in the reverse direction at 2 ml/min, followed by 24 hours shut in.
7. One pore volume of the formation water at pH 4.5 was then passed through the core at 0.07 ml/min in a forward direction to simulate water flooding, the permeability was about 12 mD,
8. One pore volume of the undiluted Mixture 2 containing mono n butylether of triethylene glycol (a preferred compound 1) was then passed through the plug in the reverse direction at 0.05 ml/min followed by isolation of the core from flow lines which are then cleaned successively with toluene, methanol and formation water. The core was shut in for 6 hrs.
9. A third water flood was performed with formation water at pH 4.5 passed at 30 ml/min in a forward direction for 125 pore volumes. The core plug was then flushed with formation water to Sw(org) whereafter the permeability was determined for both directions by passing 2 ml/min formation water through the core. The permeabilities were 255 mD) in both directions.
10. The core was then saturated with kerosene by flowing 36 pore volumes over 26 hrs at 0.3 ml/min in the forward flow direction, and then flushed to Swi with kerosene at 10 ml/min in both directions, followed by determination of the permeabilities in both directions with 10 ml/min kerosene. The permeabilities were 161 mD and 167 mD in forward and reverse directions respectively Comparison of the permeabilities to kerosene and water before and after the treatment with the compound 1 shows that the latter increases the permeabilities by more than twice (for kerosene, simulating oil) and by at least 9 times (for water).These results show the value of the compound 1 in reducing water blockage (compare steps (9) and (7) (and squeeze treatments) and also tertiary oil recovery (compare steps (10) and (5).

COMPARATIVE EXAMPLE 1

A dry core plug which was a medium grained, well cemented sandstone and high potassium feldspar content of porosity 20% from a North Sea well was vacuum saturated with simulated formation brine from that well, containing in mg/l 443230 total dissolved salt, 133644 Na, 6690 K, 18800 Mg, 127197 Ca, 3520 Sr, 162 Ba, 153030 Cl, 184 $HCO_3$, The plug was then loaded into the inner tube of a coreflood apparatus comprising a pair of concentric pressurised tubes sealable at both ends through which a liquid may be passed in either direction. The tubes were then pressurised at ambient temperature at 10.34 MPa for the annulus between the tubes (gross overburden pressure) and 3.45 Mpa pressure for the core (pore pressure).

1) The core was then saturated with kerosene by flowing kerosene over 20 hours at 0.5 ml/min. The plug was then flushed to Swi (saturation water level) using kerosene at an injection rate of 10 ml/min in both flow directions. When steady state conditions achieved, $k_{eo}$ (kerosene equilibrium permeability to oil) at Swi (saturation water level) was measured in both flow directions.
2) The coreholder and flow lines were then heated to 154° C.
3) 8 pore volumes of dead North Sea crude oil were passed in the reverse flow direction until steady state conditions achieved and the plug shut in for 24 hours at temperature.
(4) 40 pore volumes of simulated North Sea oil well formation water of pH 5.5 were injected into the plug at 4 ml/hour in the forward flow direction. The $k_{ew}$ (kerosene equilibrium permeability to water) at Swo (saturation oil level) was measured using formation water in the forward flow direction
5) The coreholder and flow lines were then cooled to 110° C.
6) Six pore volumes of 10 wt % "Scaletreat 837c" (commercially available from TR Oil Services) scale inhibitor in seawater solution were then injected into the core plug at 30 ml/hr in the reverse flow direction followed by isolation of the plug from the flow lines and excess inhibitor flushed from the rig with synthetic formation water and the core plug was bled to the face and shut in at temperature for 12 hours
7) After shut in, the coreholder and flow lines were heated to 154° C.
8) The inhibitor was then removed from the core plug using formation water (adjusted to pH 5.5) at 30 m/hr in the forward flow direction and the final effective permeability of the plug to formation water ($k_{ew}$) measured at 0.2 ml/min in both flow directions.

9) The plug was then saturated with kerosene at 0.2 ml/min for 25 hours in the forward flow direction and then flushed with kerosene at an injection rate of 10 ml/min in each flow direction until steady-state conditions were achieved and the core's effluent contained no free brine. The $k_{eo}$ of the core was then measured in each flow direction at 10 ml/min.

10) The core was then confined to a Hassler cell at 4.24 MPa confining pressure and ambient pore pressure and temperature Miscible solvent cleaning at 9.5 m/min was then carried out with 10 pore volumes of toluene followed by 10 pore volumes of methanol. This solvent cycle was repeated twice. Ten pore volumes of a 50:50 mixture of methanol and simulated formation brine were then injected into the core plug, followed by 20 pore volumes of undiluted simulated formation brine and the $k_{ew}$ of the core plug was measured in the forward flow direction at 9 ml/min. The permeability data are given in Table 1.

EXAMPLE 2

The procedure of Comparative Example 1 was repeated using a plug from the same core source except that after step 5 and prior to step 6 two pore volumes of a 15 wt % solution of Mixture 2 in seawater were then injected into the core plug at 30 ml/hr in the reverse flow direction. The treated core was then shut in at temperature for 6 hours.

The permeability data are given in Table 1

TABLE 1

| Step | Permeability | Comparative Example 1 (mD) | Example 2 (mD) |
| --- | --- | --- | --- |
|  | $k_{ew}$ at $S_{wi}$ | 226 | 181 |
| 1 | $k_{eo}$ at $S_{wi}$ | 133 | 158 |
| 4 | $k_{ew}$ at $S_{wo}$ | 28 | 10 |
| 8 | $k_{ew}$ after postflush | 57 | 167 |
| 9 | $k_{eo}$ after postflush | 78 | 233 |

These results show the value of Mixture 2 in reducing water blockage (compare steps 8 and 4) and also tertiary oil recovery (compare steps 9 and 1)

EXAMPLE 3

The process of Example 2 is repeated with the dilute solution of Mixture 2 in seawater between steps 5 and 6 but with 6 pore volumes of seawater without the scale inhibitor in step 6. The same conclusions as in Example 2 can be obtained from the results

EXAMPLE 4A

A weighed mixture of E grade sand (obtained from David Ball plc, Cambridge, 82.6% wt) and Silica flour (17.4%/wt) was packed into a 5 foot ⅜" OD stainless steel tube (a sandpack) and coiled to fit into a heated oven. The temperature was raised to 120° C., and simulated formation brine (containing 0.12 g KCl 0.17 g$MgCl_2.6H_2O$, 2.685 g NaCl 0.902 g $CaCl_2.2H_2O$, 0.05 g $SrCl_2.6H_2O$ and 0.01 g $BaCl_2.2H_2O$ dissolved in 1 L of distilled water) adjusted to pH3 with HCl was pumped through the sandpack at 1 m/min in forward direction against a back pressure of 10 Barg, until the effluent was also at pH3. Formation Brine at pH7.7 which was used for all subsequent treatments in Ex.4A–4C, was pumped at 1 ml/min. The sandpack was weighed and the pore volume (PV) calculated.

The pack was heated to 120° C., and kerosene (simulating crude oil) was pumped at 1 ml/min until no free water was visible in the effluent. Formation Brine was pumped at 1 ml/min until no oil could be seen in the effluent and the permeability of the sandpack had stabilised.

The sandpack was cooled to room temperature, depressurised, removed from the oven and attached to a pump.

The following volumes of 4M $CaCl_2$, 1M $Na_2CO_3$ solutions and 1MNaCl were pumped into the pack at 0.5 ml/min: 0.9 mls $CaCl_2$,0.5 mls NaCl, 3 mls $Na_2CO_3$,0.5 mls NaCl.

The above pump sequence was repeated a further two times, followed by 0.9 mls $CaCl_2$ and then sufficient NaCl solution to ensure that the last Ca portion had entered the pack.

The sandpack was replaced into the oven, heated to 120° C., shut in (isolated) for 24 hours. 50 ml of 0.5M $Na_2CO_3$ solution was then pumped to remove any calcium ions from the pack that had not been converted to scale in the pores.

The amount of calcium carbonate (calcite) precipitated on to the sandpack by this procedure was calculated by collecting all the effluent solutions, combining them with any material which had been washed out of the feed tubing washing the resulting precipitate, drying and weighing. Calcite deposited on the sandpack was calculated by difference. Approximately 0.5 g of material could be reproducibly deposited on the sandpack (approximately 86 g sand) by this method.

The sandpack was reconnected to the oven, pressurised to 30 Barg, heated to 120° C., formation brine (in which the calcium ions had been replaced by barium on a molar basis) was pumped at 1 ml/min. Kerosene was pumped at 1 ml/min followed by Crude oil at 0.5 ml/min no more water could be seen in the effluent. The sandpack was shut in for 24 hours, calcium free formation brine was pumped until no more oil could be seen in the effluent and the permeability had stabilised.

4B COMPARATIVE

A scaled sandpack prepared above as in example 4A was placed in the oven and heated to 120° C. 80 mls of 3.0% wt of an organic acid proprietary scale dissolver particularly effective for calcite scale (sold under the trade Mark CalAcid) in calcium free formation brine solution was pumped at 1 ml/min in reverse flow. Samples were collected in 5 ml aliquots for subsequent calcium analysis (ICP). The sandpack was shut in for 1 hour.

Calcium free formation Brine was then pumped at 1 ml/min (forward flow) to recover the acid-dissolved calcium for analysis The results are contained in table 2.

EXAMPLE 4C

A scaled sandpack prepared as in example 4A was placed in the oven and heated to 120° C. 80 ml of the aqueous calcium free formation brine solution containing 15% wt of Mixture 2 was pumped at 1 ml/min in reverse flow. The pack was shut in for 1 hour. 30 mls of calcium free formation brine was pumped to act as a spacer, followed by 80 mls of 3.0%/wt of the organic acid used in Ex. 4B in brine solution was pumped at 1 ml/min in reverse flow. Samples were collected in 5 m) aliquots for subsequent calcium analysis (ICP). The sandpack was shut in for 1 hour.

Calcium free Brine was then pumped at 1 ml/min (forward flow) to recover the acid dissolved calcium for analysis. 30 ml of the aqueous solution containing 15% wt of Mixture 2 used earlier was then pumped to simulate the return of the fluid towards the producing well as would be seen in a field operation.

The results are contained in table 2

TABLE 2

| Example | (Comparative) 4B | 4C |
|---|---|---|
| Mass sand/g | 86.05 | 85.85 |
| Pore Volume/ml | 15.8 | 15.6 |
| Mass Scale/mg | 516 | 498 |
| Scale removed mg | 240 | 370 |
|  | (46.5%) | (74.2%) |

Table 1 shows that using the Acid alone (example 4B) results in some scale dissolution (46.5%) but by using the glycol ether solution (Ex.4C), 74.2% of the scale is removed, an improvement of 60% over the comparative sample.

EXAMPLE 5

In a field trial in a North Sea well, 92 barrels of Mixture 2 were pumped at 15 barrels per minute down the well and there injected for 3 ft radially into an underground formation. The well was then shut in for 6hr, and then production restarted. The well head formation pressures before and after the treatment with mixture 2 were in the range 109.0–113.5 barg, the pressure 5 and 6 days after the treatment being lower than before the treatment. The production oil rate (barrels per day) increased from 8430 before the treatment to values after treatment of 9504, 12318 and 12489 (after 2, 5 and 6 days). The watercut (the percentage of water in the produced well fluids) decreased from 14.8% before treatment to 11.67, 10.66 and 8.02% (2, 5 and 6 days after treatment.

EXAMPLES 6 And 7

In a similar manner to that of Ex.1, the permeabilities of other sandstone cores from a different N. Sea well were determined. The cores were medium grained well cemented sandstone of 14.5–15% porosity and permeability 198–1428 mD. The cores were tested in the form of plugs about 8 cm long×2.5 cm diameter of pore volume 12.82 ml. In the core the confining pressure was 1000 psig and the back pressure 200 psig.

The core in the coreflood apparatus was then treated as follows.
1. The core was cleaned by alternate injection of toluene and methanol to remove hydrocarbons or polar components.
2. The core was then saturated with crude oil from the same well as the core at 240 ml/hr for approximately 1 hour. The core was heated to 130° C., and the liquid permeability to crude oil was then determined by flooding the core sample at 30, 60, 120 and 240 ml/hr, and recording the differential pressure across the core The slope of the plot of the differential pressure against the flow rate was used to calculate the initial sample permeability, following Darcy's equation.
3. The crude oil saturated core was then injected with synthetic sea water containing in mg/l Na 10890, K 460, Ca 428, Mg 1328 Ba 0, Sr8, C119700, $SO_4$ 2960 $HCO_3$124 at 240 m/hr for ten pore volumes to reduce the oil content to the $S_{wo}$ (org., saturation oil level). An arbitrary pore volume was assigned based on an assumed sample porosity of 20%.
4. The sea water was displaced from the core by flooding with the crude oil at a flow rate of 240 ml/hr, for 10 pore volumes and the oil permeability determined at saturation water level $S_{wo}$.
5. An aqueous brine solution containing 15% wt of Mixture 2, was then injected into the core at 240 ml/hr for 5 pore volumes.
6. Crude oil was again applied to the core at 240 ml/hr for 10 pore volumes, and then sea water and the permeability to crude at saturation water level determined as before.
7. The sample was re-cleaned using toluene and methanol and as before and re-saturated with crude oil, the final permeability to crude was then measured.

The results were as follows.

| Example | 6 | 7 |
|---|---|---|
| Permeability | mD | mD |
| Initial | 1194 | 219 |
| At S (Wr) | 320 | 66.2 |
| At S (Wr) after Mixture 2 | 776 | 242 |
| Final | 1426 | 321 |

The results show improvements of 140% and 260% respectively in the oil permeability and 19% and 47% respectively in the absolute permeability of the cores following treatment of the core with the aqueous solution of Mixture 2.

We claim:

1. A method of recovering at least one of oil and gas from an underground formation comprising oil or gas wherein an aqueous formulation, comprising 1–60% by weight of at least one mono alkyl ether of polyethylene glycol in which the alkyl group has 3–5 carbons and the polyethylene glycol contains 3–6 ethylene oxy units is introduced into said formation and oil and/or gas is recovered wherein the method is not a squeeze treatment in which at least one alkyltriglycol ether and at least one water-miscible oil or gas field production chemical are introduced into the formation.

2. A method according to claim which is well stimulation.

3. A method according to claim 2 in which the well stimulation comprises acidising or reduction in water blocking.

4. A method according to claim 1 which is a tertiary oil recovery method.

5. A method according to claim 1 in which the mono alkyl ether of polyethylene glycol is a mono alkyl ether of triethylene glycol.

6. A method according to claim 5 in which the mono alkyl group is selected from the group consisting of an n, iso, sec or tert butyl group.

7. A method according to claim 6 in which the mono alkyl ether of polyethylene glycol is a mono n-butyl ether of triethylene glycol.

8. A method according to claim 1 which comprises introducing into the formation a mixture of said alkyl ethers, of which at least 60% is a butyl triethylene glycol.

9. A method according to claim 8 which comprises introducing into the formation a mixture comprising said alkyl ether and at least one of a mono alkyl ether of mono and di ethylene glycol.

10. A method according to claim 9 in which the mixture comprises 70–80% n-butyl tryethylene glycol ether, 15–25% butyl tetraethylene glycol ether, 1–5% butyl pentaethylene glycol ether and 1–5% butyl diethylene glycol ether.

11. A method according to claim 1 in which the aqueous formulation comprises 6–50% by weight of said mono alkyl ether or ethers.

12. A method according to claim 1 wherein the aqueous formulation is substantially free of isopropanol.

13. A method according to claim 12 wherein the aqueous formulation is substantially free of a polar organic solvent which is an alcohol.

14. A method according to claim 2, wherein the aqueous formulation comprises 6–50% by weight of said mono alkyl ether or ethers, comprising mono n-butyl ether of triethylene glycol and is substantially flee of isopropanol.

15. A method of increasing the recovery of at least one of oil and gas from an underground formation comprising oil or gas wherein an aqueous formulation, comprising 1–60% by weight of at least one mono alkyl ether of polyethylene glycol in which the alkyl group has 3–5 carbons and the polyethylene glycol contains 3–6 ethylene oxy units is introduced into said formation and oil and/or gas is recovered wherein the method is not a squeeze treatment in which at least one alkyltriglycol ether and at least one water-miscible oil or gas field production chemical are introduced into the formation.

16. A method according to claim 15 which is well stimulation.

17. A method according to claim 16 in which the well stimulation comprises acidising or reduction in water blocking.

18. A method according to claim 15 in which the mono alkyl ether of polyethylene glycol is a mono alkyl ether of triethylene glycol.

19. A method according to claim 15 which comprises introducing into the formation a mixture of said alkyl ethers, of which at least 60% is a butyl triglycol ether.

* * * * *